3,219,688
TRICHLOROBENZYLOXYALKYL ESTERS OF
CHLORINATED ALIPHATIC ACIDS
Edward D. Weil, Lewiston, Jerome Linder, Niagara Falls,
Edwin Dorfman, Grand Island, and Jack S. Newcomer,
Wilson, N.Y., assignors to Hooker Chemical Corporation, Niagara Falls, N.Y., a corporation of New York
No Drawing. Filed July 19, 1961, Ser. No. 125,066
The portion of the term of the patent subsequent to
June 9, 1981, has been disclaimed
7 Claims. (Cl. 260—487)

This application is a continuation-in-part of S.N. 791,015, filed February 4, 1959, now United States Patent No. 3,006,967.

This invention describes new and useful herbicidal halogenated aromatic esters and methods for their use.

More specifically, this invention relates to trichlorobenzyloxyalkyl esters of chlorinated aliphatic and phenoxyaliphatic acids and methods for employing them as herbicides, growth regulants, biological sterilants and the like. These novel compositions have the structure:

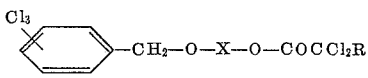

wherein X is an organic radical selected from the group consisting of alkylene, alkyleneoxyalkylene, hydroxyalkylene, and hydroxyalkylene partially or completely acylated by a —COCCl$_2$R radical, said group X having from two to six carbon atoms, exclusive of the —COCCl$_2$R radicals, and R is an organic radical chosen from the group consisting of chlorine, methyl or chloromethyl.

Examples of compounds included in this invention include, but are not limited to the following named or illustrated compounds:

trichlorobenzyloxyethyl trichloroacetate,
trichlorobenzyloxyethyl 2,2-dichloropropionate,
trichlorobenzyloxyethyl 2,2,3-trichloropropionate,
2-(trichlorobenzyloxy)propyl trichloroacetate,
2-(trichlorobenzyloxy)propyl 2,2-dichloropropionate,
2-(trichlorobenzyloxy)propyloxy 2,2,3-trichloropropionate;
1-(trichlorobenzyloxy)-2-propyl trichloroacetate;
1-(trichlorobenzyloxy)-2-propyl 2,2-dichloropropionate,
1-(trichlorobenzyloxy)-2-propyl 2,2,3-trichloropropionate;
2-(trichlorobenzyloxy)-1-butyl trichloroacetate;
2-(trichlorobenzyloxy)-1-butyl, 2,2-dichloropropionate,
2-(trichlorobenzyloxy)-1-butyl 2,2,3-trichloropropionate;
3-(trichlorobenzyloxy)-1-butyl trichloroacetate;
3-(trichlorobenzyloxy)-1-butyl 2,2-dichloropropionate;
3-(trichlorobenzyloxy)-1-butyl 2,2,3-trichloropropionate;
4-(trichlorobenzyloxy)-1-butyl trichloroacetate;
4-(trichlorobenzyloxy)-1-butyl 2,2-dichloropropionate;
4-(trichlorobenzyloxy)-1-butyl 2,2,3-trichloropropionate;
trichlorobenzyloxyethoxyethyl trichloroacetate,
trichlorobenzyloxyethoxyethyl 2,2-dichloropropionate;
trichlorobenzyloxyethoxyethyl 2,2,3-trichloropropionate;
trichlorobenzyloxypropoxypropyl trichloroacetate;
trichlorobenzyloxypropoxypropyl 2,2-dichloropropionate;
trichlorobenzyloxypropoxypropyl 2,2,3-trichloropropionate;
3-trichlorobenzyloxy-2-hydroxy-1-propyl trichloroacetate;
3-trichlorobenzyloxy-2-hydroxy-1-propyl 2,2-dichloropropionate;
3-trichlorobenzyloxy-2-hydroxy-1-propyl, 2,2,3-trichloropropionate;
3-trichlorobenzyloxy-1,2-propylene bis-trichloroacetate;
3-trichlorobenzyloxy-1,2-proylene bis-2,2-dichloropropionate;
3-trichlorobenzyloxy-1,2-propylene bis-2,2,3-trichloropropionate, as well as the following compositions shown structurally:

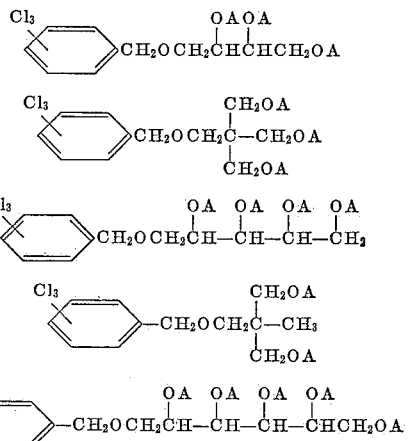

wherein A is an organic radical selected from the group consisting of hydrogen and OCOCCl$_2$R, at least one A being O$_1$COCCl$_2$R, and R having the same meaning as previously defined.

The trichlorobenzyloxy group named or illustrated is defined as including the 2,3,4-, 2,3,5-, 2,3,6-, 2,4,5-, 2,4,6- and 3,4,5-trichloro configurations or a mixture of one or more of these.

While all of the named and illustrated compositions of this invention are effective herbicides, as in any broad and large group of compounds, for various reasons, there will be a preferred group or sub-group. In this instance, because of their high activity and lower cost of production, the preferred group of compositions of this invention are those having the 2,3,6-trichloro configuration. Similarly, because the crude reaction products of this invention are a mixture of the various isomers including the highly active 2,3,6-trichloro compositions, a preferred subgroup of compositions are the compositions rich in 2,3,6-isomers or more precisely, those isomer mixtures having at least a thirty percent 2,3,6-isomer concentration. While concentrations having near one hundred percent of the 2,3,6-isomers are undoubtedly more advantageous, the cost and time consumed in separating and concentrating these complex chlorination mixtures makes their resolution impractical except for non-herbicidal uses.

The compositions of this invention are viscous high-boiling liquids or low melting solids, insoluble or slightly soluble in water and soluble in most organic solvents. These products are made by esterifying the trichlorobenzyloxyalkanols whose preparation is disclosed in co-pending application S.N. 791,015. The esterification conditions comprise heating the trichlorobenzyloxyalkanol with an acid chosen from the group consisting of trichloroacetic, 2,2-dichloropropionic or 2,2,3-trichloropropionic acid until the ester is formed during the esterification by azeotropic distillation with an appropriate inert solvent such as benzene or an alkylbenzene. The preparation of the preferred 2,3,6-trichloro configuration is given in the aforementioned parent case wherein the starting material is toluene or o-chlorotoluene. In addition, good yields of "2,3,6" are obtained using 2,6-dichlorotoluene, 2,5-dichlorotoluene, 2,3-dichlorotoluene or a mixture of any or all of these starting materials. Since configuration is not altered in esterification, the esters have the same isomer composition as the parent alcohol.

One of the major problems in weed control is lack of herbicides suitable for low cost weed control on land of low economic value such as low level agricultural land, highway shoulders, rights of way along railroad tracks and power lines, drainage ditches and canals, storage areas, parking areas, and any other area where all weed growth is objectionable and where cost of treatment is a major factor. To be acceptable for these uses, the herbicide used must offer low cost of application, coupled with long term persistance. An ancillary problem involved is that all sorts of weeds, annual and perennial, broadleaf (dicotyledonous) and narrow leaf or grassy (monocotyledonous) are encountered. Thus, in addition to being low in cost and having long term persistance, the herbicide to be truly useful would have to be active against the broad spectrum of weeds encountered under diverse conditions of soil and climate. While several commercially available herbicides would seem at first glance to be quite satisfactory, they have disadvantages which make their use impractical under the stringent requirements and conditions of this invention. For example, three otherwise satisfactory herbicides, trichloroacetic acid, 2,2,3-trichloropropionic acid, 2,2-dichloropropionic acid and their salts are useful to control narrow leaf or grassy weeds but are almost inactive against the broadleaf or dicotyledonous weeds. In addition, the herbicidal effect of these compositions is comparatively ephemeral and their phytotoxicity dissipates or disappears completely after a few weeks or months, making additional applications of the herbicide a prerequisite of effective weed control.

Thus, there is a real need for the herbicides of this invention which in addition to high phytotoxicity per se, offer the unusual combination of advantages of low cost, effective control by application, with resultant long term phytotoxicity against both monocotyledonous and dicotyledonous weeds. Furthermore, these herbicides are safe and easy to apply. While a broad spectrum of activity, low cost and long term phytotoxicity are the salient advantages of the herbicidal compositions of this invention, there are other important and additional advantages, some of which will be disclosed for the sake of illustration.

An additional advantage of the novel herbicides of this invention is that they lend themselves to use in various states and grades of purity, ranging from the highly purified oil or crystalline product to a technical crude. Furthermore, these herbicidal compositions offer the advantage of combatability with a host of other herbicides including the tri- and tetrachlorophenylacetic acids and the sodium borates and calcium borates, 2,4-D and other herbicidal phenoxy aliphatic acids and esters, simazine and other herbicidal ureas, herbicidal petroleum oils, hexachlorocyclopentadiene, pentachlorophenol, dinitro - o - alkylphenols, sodium trichloroacetate, ethylene glycol trichloroacetates and other trichloroacetates, esters of 2,2-dichloropropionic acid and sodium 2,2-dichloropropionate. These combinations of herbicides frequently enhance, potentiate, synergize or otherwise advantageously extend the range, scope or effect of the herbicidal trichlorobenzyloxyalkanol esters of the invention. In addition to herbicides, fungicides such as the metal dimethyldithiocarbamates and ethylenebis-(dithiocarbamates), insecticides such as benzene hexachloride and chlordane, and fertilizers such as urea and ammonium nitrate, and various adjuvants and diluents well known to the art may be efficaceously combined with the inventive composition. Thus, these herbicides may be used by themselves or made the subject of liquid or solid formulations ranging from the very simple to the most complex. For example, if it is desired, these compositions may be made the subject of a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, vermiculite, borates, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. By the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67 and No. 10, pages 38–67, 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, the weeds to be eradicated, the equipment available and the convenience of the user, a preferred embodiment of this invention is to apply the herbicides of this invention to the weed population in post-emergence use or to soil where weed growth is to be suppressed or prevented in pre-emergence use. The herbicides may be made up as a dust, spray or granulation containing one or more surface active agents and/or conditioning agents, with the herbicide alone or in combination with one or more herbicidal or biological toxicants with the necessary solid or liquid diluent(s) or carrier(s).

The rate of application of the herbicidal esters of this invention cannot be precisely stated due to varying degrees of resistance possessed by the weed species, the stage of weed growth, the soil type and climate conditions, but in general, the rates will be at least one-quarter of a pound of herbicide per acre and for reasons of cost, will seldom exceed one hundred pounds per acre with the preferred range falling within one-half to fifty pounds per acre. Where the weeds are in an early stage of growth, and hence more susceptible, they will frequently respond to lower rates of application ranging from one-half to four pounds per acre while older weeds, perennial weeds, or resistant species may require rates in excess of four pounds per acre. In those instances where the weed population has been allowed to accumulate unchecked or where mature plants are encountered, applications of up to and even beyond this rate may be required. For eradication of deeply-rooted or herbicide resistant perennial weeds such as Johnson grass or field bindweed, or for long term sterilization of the soil, rates of ten to more than one hundred pounds are often found to be necessary.

The following examples are intended to illustrate the workings of this invention including such facets as the preparation of the herbicidal composition, their formulation as herbicidal agents, and the testing results obtained using representative compounds as herbicides. The details of certain embodiments either in the preceding specifications or foregoing examples is not intended to place limitations upon the inventive method except as set forth in the claims.

*Example 1*

This example shows the preparation and analysis of the alcohol or glycol reactant used to make the composition of this invention; the members of the X group in the above-shown general formula are indicated in the first column of the chart below.

Toluene was chlorinated at sixty to seventy degrees centigrade in the presence of 0.1 percent ferric chloride as a catalyst until the weight uptake indicated about 2.5 moles of chlorine had reacted. The product was distilled and the fraction boiling one hundred and twenty to one hundred and forty degrees centigrade (twenty mm.), was taken. Analysis by infrared indicated an isomer content of twenty-five to forty percent 2,4,5-, forty to fifty percent 2,3,6-, and ten to fifteen percent 2,3,4-trichlorotoluene. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (six mm.). This trichlorobenzyl chloride was added with stirring to 1.5 molar equivalents of caustic soda in a molar excess of the chosen glycol, at one hundred and forty to one hundred and fifty degrees centigrade, and the reaction mixture heated and stirred for about three hours. The mixture was then poured into water, exhaustively extracted with toluene, and the toluene extracts combined and distilled under reduced pressure to obtain the desired product. Infrared analysis shows these products to have substantially the same isomer distribution as the trichlorotoluene intermediate.

at one hundred and forty-five to one hundred and fifty degrees centigrade, the reaction mixture is mixed with two thousand parts of water and one thousand parts of toluene; the toluene layer then separated and fractionated, yielding sixty-five parts of 2-(2,3,6-trichlorobenzyloxy)ethanol, boiling point one hundred and eighty-one to one hundred and ninety-two degrees centigrade (six mm.).

*Analysis.*—Calcd. for $C_9H_9Cl_3O_2$: Cl, 41.6 percent. Found: Cl, 41.2 percent.

*Example 3*

By the method of the foregoing example, 2,3,6-trichlorobenzyl chloride is reacted with propylene glycol to obtain a colorless liquid, boiling point one hundred and eight degrees centigrade (0.05 mm.).

*Analysis.*—Calcd. for $C_{10}H_{11}Cl_3O_2$: Cl, 39.5 percent. Found: Cl, 39.2 percent.

*Example 4.—Preparation of the trichloroacetate of trichlorobenzyloxyethanol*

The trichlorobenzyloxyalkanol from Example 1 is admixed with one molar equivalent of trichloroacetic acid plus one part by weight of toluene per part of alcohol and

| Composition No. | Group —X— | Glycol Employed | Description of Product | Analysis | |
|---|---|---|---|---|---|
| | | | | Cl Calcd. | Cl Found |
| 1 | —CH$_2$CH$_2$— | Ethylene glycol | Semi-solid, B.P. 181–192° C. (6 mm.) | 41.6 | 41.2 |
| 2 | —CH$_2$CH$_2$CH$_2$CH$_2$— | 1,4-butanediol | Viscous syrup, B.P. 140–168° C. (0.25 mm.) | 37.6 | 37.3 |
| 3 | —CH$_2$CH(CH$_2$)— | 1,2-propanediol | Viscous syrup, B.P. 140–168° C. (0.5 mm.) | 39.5 | 37.9 |
| 4 | —CH$_2$CHOHCH$_2$— | Glycerol | Very viscous syrup decomp. on dist. | 37.5 | 39.3 |
| 5 | —CH$_2$CH$_2$OCH$_2$CH$_2$— | Diethylene glycol | Viscous syrup, B.P. 175–185° C. (0.05 mm.) | 35.5 | 34.0 |
| 6 | —CHCH(CH$_3$)OCH$_2$CH(CH$_3$)— | Dipropylene glycol | Viscous syrup, B.P. 180–185° C. (0.05 mm.) | 32.5 | 32.7 |
| 7 | —CH(CH$_3$)CHCH(CH$_3$) | 2,3-butanediol | Viscous syrup, B.P. 170–176° C. (5 mm.) | 37.7 | 37.8 |
| 8 | —CH$_2$CH$_2$CH(CH$_3$)— | 1,3-butanediol | Viscous syrup, B.P. 171–182° C. (5 mm.) | 37.7 | 37.3 |
| 9 | —(CH$_2$CH$_2$O)$_2$CH$_2$CH$_2$— | Triethylene glycol | Viscous syrup, B.P. 210–250° C. (0.38 mm.) | 31.0 | 28.8 |
| 10 | —CH$_2$CH$_2$—* | Ethylene glycol | Semisolid, B.P. 175–190° C. (5 mm.) | 41.6 | 41.0 |
| 11 | —CH$_2$CH(CH$_3$)—* | 1,2-propane diol | Viscous semi-solid, B.P. 145–160° C. (0.5 mm.) | 39.5 | 39.0 |

*As composition 1 or 3 but prepared from orthochlorotoluene (infrared analysis shows sixty to seventy percent 2,3,6-isomer and thirty to forty percent 2,4,5-isomer in the final product).

*Example 2.—Preparation of 2-(2,3,6-trichlorobenzyloxy)-ethanol*

2,3,6-trichlorotoluene prepared by the method of Brimelow, Jones and Metcalf (J. Chem. Soc., 1951, 1208), is chlorinated at one hundred to one hundred and twenty degrees centigrade, under irradiation by a mercury vapor lamp until 0.7 to 0.8 mole of hydrogen chloride per mole of the toluene is evolved. The resultant 2,3,6-trichlorobenzyl chloride, boiling point one hundred and fifty to one hundred and fifty-five degrees centigrade (eighteen mm.), is separated from unreacted 2,3,6-trichlorotoluene by fractionation. A solution of forty-four parts of caustic soda in two hundred and fifty parts of ethylene glycol is prepared by warming to one hundred and eighty-five degrees centigrade, then cooled to one hundred and forty-five degrees centigrade, and one hundred and fifteen parts of 2,3,6-trichlorobenzyl chloride is added. After three hours refluxed in a suitable reaction vessel fitted with a continuous decanter in the reflux line, continually separating the co-distilled water until no further evolution of water occurs. The reaction mixture is stripped free of toluene, leaving a substantially quantitative yield of trichlorobenzyloxyethanol. Infrared analysis indicates that the isomeric distribution is twenty-five to forty percent 2,4,5-, forty to fifty percent 2,3,6-, and ten to fifteen percent 2,3,4-trichlorobenzyloxyethyl trichloroacetate.

*Analysis.*—Calcd. for $C_{11}H_6O_3Cl_6$: Cl, 53.0 percent. Found: Cl, 53.0 percent.

*Example 5.—Preparation of the trichloroacetate of trichlorobenzyloxypropanol*

Using the procedure and equipment of Example 4, the indicated trichlorobenzyloxyalkanol and the indicated acid, the following products are prepared.

| Alcohol Reactant of Ex. I by Composition No. | Acid Reactant | Description of Ester | Description Analysis, percent | |
|---|---|---|---|---|
| | | | Cl Calcd. | Cl found |
| Composition 1 | CH$_2$ClCCl$_2$COOH | Colorless liquid | 51.5 | 50.7 |
| Composition 1 | CH$_3$CCl$_2$COOH | do | 46.8 | 46.0 |
| Composition 3 | CCl$_3$COOH | do | 51.1 | 50.8 |
| Composition 3 | CH$_3$CCl$_2$COOH | do | 45.0 | 44.8 |
| Composition 4 | CCl$_3$COOH (one mole) | do | 49.4 | 49.2 |
| Composition 4 | CCl$_3$COOH (two moles) | do | 55.3 | 54.9 |
| Composition 10 | CCl$_3$COOH | Colorless liquid, B.P. 120° C. (0.01 mm.)* | 53.0 | 52.6 |
| Composition 11 | CH$_3$CCl$_2$COOH | Colorless liquid | 45.0 | 44.9 |
| Composition 4 | CH$_3$CCl$_2$COOH (two moles) | do | 46.3 | 46.9 |

*Short-path still was used.

These esters, except where indicated, were not distilled because of indications of decomposition near their boiling points (darkening and HCl evolution).

Example 6

An emulsifiable herbicidal oil formulation is made by blending the following ingredients:

| | Parts by weight |
|---|---|
| Trichlorobenzyloxypropyl trichloroacetate | 1 |
| High aromatic naphtha | 1.9 |
| Emulsifier (alkylaryl sulfonatepolyoxyethylene blend) | 0.1 |

Example 7

A herbicidal oil spray formulation is made by blending the following ingredients.

| | Parts by weight |
|---|---|
| 3-(trichlorobenzyloxy)-1,2-propylenebis-trichloroacetate | 1 |
| Diesel oil | 99 |

This spray produced one hundred percent kill of Johnson grass when sprayed at the rate of fifty gallons per acre.

Example 8

A five percent granular formulation was produced by spraying one part by weight of 2,3,6-trichlorobenzyloxypropyl-2,2-dichloropropionate onto nineteen parts by weight of granular attapulgus clay, while tumbling the clay in a rotating drum. Free-flowing granules were obtained.

Example 9

An area infested with a mixed population of broadleaf perennial weeds including wild carrot, Canada thistle, field bindweed, hedge bindweed, and plantain, plus a mixed population of perennial grasses including quackgrass and bluegrass was divided into plots, which were sprayed with various of the chemicals of the invention, and with other chemicals for comparison at ten and forty pounds per acre. Other plots were left untreated as controls. One year later, the treated area was inspected and the repression of weed population noted relative to the control areas.

chloroacetate. During the following summer, substantially complete control of the indicated species was obtained.

Similar results were obtained with 2,3,6-trichlorobenzyloxypropyl trichloroacetate and 2,3,6-trichlorobenzyloxypropyl 2,2-dichloropropionate, and with isomer mixtures of these esters comprising about sixty to seventy percent of the 2,3,6-isomer and thirty to forty percent of the 2,4,5-isomer.

Example 11

A strip of soil under a highway guard rail was sprayed at the rate of one hundred pounds per acre with a mixture having the approximate composition (by infrared analysis):

40–50 percent 2,3,6-trichlorobenzyloxypropyl trichloroacetate

25–40 percent 2,4,5-trichlorobenzyloxypropyl trichloroacetate

10–15 percent 2,3,4-trichlorobenzyloxypropyl trichloroacetate

Few percent 2,4,6-trichlorobenzyloxypropyl trichloroacetate.

Almost one hundred percent control of all weed growth was observed for two years following the application. In nearby untreated areas, plantain, chicory, quackgrass, poison ivy, teazel, dandelion, and foxtail were growing in heavy stands.

We claim:

1. Trichlorobenzyloxyalkyl esters of the structure:

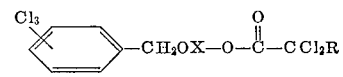

wherein R is selected from the group consisting of chlorine, methyl and chloromethyl and X is selected from the group consisting of alkylene, alkylene-oxy-alkylene, hydroxyalkylene, and hydroxyalkylene at least partially esterified by a COCCl$_2$R radical, the group X having from two to six carbon atoms exclusive of the COCCl$_2$R radicals.

2. 2,3,6-trichlorobenzyloxyethyl trichloroacetate.

| Isomer Composition as in Parent Alcohol of Example No. 1, Cmpd. 1 | | Est. Percent Reduction in Weed Population Relative to Control Areas | | | |
|---|---|---|---|---|---|
| | | Broadleaf Weeds | | Grassy Weeds | |
| | | At 10 Lbs./Acre | At 40 Lbs./Acre | At 10 Lbs./Acre | At 40 Lbs./Acre |
| Trichlorobenzyloxyethyl trichloroacetate | Compound 1 | 65 | 100 | 30 | 100 |
| Trichlorobenzyloxyethyl 2,2-dichloropropionate | Compound 1 | 75 | 100 | 50 | 100 |
| Trichlorobenzyloxyethyl 2,2,3-trichloropropionate | Compound 10 | 80 | 100 | 60 | 100 |
| Trichlorobenzyloxypropyl trichloroacetate | Compound 3 | 70 | 100 | 40 | 100 |
| Trichlorobenzyloxypropyl 2,2-dichloropropionate | Compound 3 | 75 | 100 | 50 | 100 |
| Trichlorobenzyloxypropyl 2,2,3-trichloropropionate | Compound 3 | 50 | 100 | 40 | 100 |
| 3-(Trichlorobenzyloxy)-2-hydroxy-1-propyl trichloroacetate | Compound 4 | 65 | 100 | 30 | 100 |
| 3-(Trichlorobenzyloxy)-2-hydroxy-1-propyl α,α-dichloropropionate | Compound 4 | 75 | 100 | 50 | 100 |
| 3-(Trichlorobenzyloxy)-1,2-propylene bis-trichloroacetane | Compound 3 | 60 | 100 | 60 | 100 |
| 3-(Trichlorobenzyloxy)-1,2-propylene bis-(2,2-dichloropropionate) | Compound 3 | 70 | 100 | 70 | 100 |
| Trichlorobenzyloxyethoxyethyl trichloroacetate | Compound 5 | 40 | 90 | 40 | 90 |
| Trichlorobenzyloxypropoxypropyltrichloroacetate | Compound 6 | 30 | 80 | 30 | 80 |
| Trichlorobenzyloxyethanol | Compound 1 | 50 | 90 | 10 | 50 |
| Trichlorobenzyloxypropanol | Compound 3 | 50 | 90 | 20 | 60 |
| Trichloroacetic acid (as sodium salt) | | 0 | 0 | 10 | 50 |
| 2,2-Dichloropropionic acid (as sodium salt) | | 0 | 0 | 20 | 75 |
| 2,4,5-Trichlorobenzyloxyethyl trichloroacetate | | 0 | 40 | 10 | 30 |

Example 10

An area infested with seeds of crabgrass (*Digitaria sanguinalis*) and ragweed (*Ambrosia artemisiifolia*), was treated in the early spring (before weed emergence) with two pounds per acre of 2,3,6-trichlorobenzyloxyethyl tri- 3. 2,3,6-trichlorobenzyloxyethyl 2,2-dichloropropionate.

4. 2,3,6-trichlorobenzyloxyethyl 2,2,3-trichloropropionate.

5. 2-(2,3,6-trichlorobenzyloxy)propyl 2,2-dichloropropionate.

6. 2-(2,3,6-trichlorobenzyloxy)propyl 2,2,3 - trichloropropionate.

7. 2-(2,3,6-trichlorobenzyloxy)propyl trichloroacetate.

References Cited by the Examiner

UNITED STATES PATENTS

| | | | |
|---|---|---|---|
| 2,734,076 | 2/1956 | Pumpelly | 260—487 |
| 2,861,097 | 11/1958 | Senkbeil et al. | 260—487 |
| 2,850,526 | 9/1958 | Senkbeil | 260—487 |
| 2,861,097 | 11/1958 | Senkbeil et al. | 260—487 |
| 3,006,967 | 10/1961 | Newcomer et al. | 260—487 |

LORRAINE A. WEINBERGER, *Primary Examiner.*

TOBIAS E. LEVOW, LEON ZITVER, *Examiners.*